Patented Mar. 20, 1951

2,545,948

UNITED STATES PATENT OFFICE 2,545,948

FLAME-RESISTANT ZINC ETHYLENE BIS-DITHIOCARBAMATE FUNGICIDAL POWDER

Albert L. Flenner, Wilmington, Del., assignor to E. I. du Pont de Nemours & Company, Wilmington, Del., a corporation of Delaware No Drawing. Application September 25, 1948, Serial No. 51,297

3 Claims. (Cl. 167—22)

This invention relates to fungicidal compositions. More particularly it relates to flame-resistant, water-dispersible, fungicidal powders containing zinc ethylene bis-dithiocarbamate as an active fungicidal agent.

Zinc ethylene bis-dithiocarbamate is a water-insoluble solid. It is an agent which has found some use in controlling certain fungus diseases which attack growing crops.

In order to keep packaging, shipping and storage costs at a minimum, it is a common commercial practice, whenever possible, to supply fungicidal compositions to the consumer for agricultural use in the form of high-strength, water-dispersible powders. The farmer usually applies the product to his crops as a dust or else he stirs the product into water to obtain a dispersion or suspension and then sprays this mix on his crops.

The preparation and distribution of water-dispersible powders containing predominantly zinc ethylene bis-dithiocarbamate presents difficulties and hazards because of the inflammable nature of zinc ethylene bis-dithiocarbamate. Great care is needed in manufacture of the compound to guard against ignition of the compound in processing thru drying and grinding operations. Also because of the inflammability of zinc ethylene bis-dithiocarbamate, storage and handling of the compound by the common carrier, the dealer, and the ultimate consumer, the farmer, requires extra precautions.

In the past the problem of handling the inflammable zinc ethylene bis-dithiocarbamate has been avoided by the preparation and sale of an aqueous solution of a water-soluble salt of ethylene bis-dithiocarbamate such as the sodium salt. The consumer then had the task of preparing the zinc ethylene bis-dithiocarbamate prior to application by adding a water-soluble, inorganic zinc salt such as zinc chloride to the aqueous solution of the water-soluble salt to precipitate the desired zinc ethylene bis-dithiocarbamate. This procedure has certain obvious shortcomings: for example, the aqueous solutions of sodium ethylene bis-dithiocarbamate contain in the order of 70% or more water, thus requiring the shipment and handling of large amounts of water with its attendant high shipping costs; also the farmer has to buy two different chemicals and mix them in certain proportions to effect the chemical reaction; additionally what the farmer obtains for his extra effort and expense is a slurry or dispersion of the toxicant in water thus limiting the manner of application to that of spraying the dispersion and eliminating the dusting method of application.

It is an object of this invention to provide flame-resistant, fungicidal dusts containing zinc ethylene bis-dithiocarbamate in high concentration. Another object is to provide fire-resistant, fungicidal powders containing as much as about 83% zinc ethylene bis-dithiocarbamate which are well suited for application to growing crops by the dusting method or which, alternatively, may be easily dispersed in water to give suspensions suitable for application by spraying. Still other objects will become apparent hereinafter.

The foregoing and other objects of the invention are attained by admixing zinc ethylene bis-dithiocarbamate with an amount of fuller's earth corresponding to at least about 20% by weight of the zinc ethylene bis-dithiocarbamate.

I have found that the fireproofing action of relatively small amounts of fuller's earth on zinc ethylene bis-dithiocarbamate is unique and specific. While the mixture of the highly inflammable zinc ethylene bis-dithiocarbamate with as little as 20% of its weight of fuller's earth gives a composition which will not support combustion, I have been unable to find any other natural occurring conditioning material which exhibits such fireproofing coaction with zinc ethylene bis-dithiocarbamate.

As illustrative of the wide variety of materials which are ineffective in providing a non-combustion supporting zinc ethylene bis-dithiocarbamate dust, even if mixed with the zinc compound in amounts as high as 60% by weight of the zinc compound, are the following materials: bentonite, talc, pyrophyllite, celite (a diatomaceous earth), whole wheat flour, walnut shell flour, cornstarch and cretaceous sedimentary kaolins, or china clays, such as Homer clay, Bancroft clay and Chicora #3.

While it is to be expected that some of the aforementioned materials may yield fire-resistant mixtures with zinc ethylene bis-dithiocarbamate by adding considerably larger amounts of the conditioning agent and reducing the amount of the zinc compound in the mixture, I have found that fuller's earth is unique in effecting the fireproofing action when mixed with zinc ethylene bis-dithiocarbamate in amount corresponding from about 20% to about 60% by weight of the zinc compound.

I have found additionally that the fireproofing action of small amounts of fuller's earth on zinc ethylene bis-dithiocarbamate is specific and does not occur with other insoluble, metallic ethylene bis-dithiocarbamates such as the manganese and ferric salts.

Any of the commercially available fuller's earths are suitable for use in the compositions of the invention. While the chemical analysis of fuller's earth will vary rather considerably depending on whether it is obtained from the Florida-Georgia area, from the Texas, Illinois, or other lesser deposits, such variation does not substantially affect the fireproofing coaction of the material with zinc ethylene bis-dithiocarbamate. In general fuller's earth has been said to have as its base hydrated aluminum silicates of amorphous structure and to contain additionally incompletely decomposed mineral matters and various detritral materials. It has a fine, porous structure. It is particularly characterized by containing a relatively high percentage of combined water and by its unusual power of absorbing and retaining organic coloring matter when used in treatment of oils.

An analysis of a typical fuller's earth of the Florida-Georgia type which is particularly suited for the preparation of the compositions of the invention is as follows:

| | | |
|---|---|---|
| $SiO_2$ | percent | 67.0 |
| $Al_2O_3$ | do | 12.5 |
| $MgO$ | do | 11.0 |
| $Fe_2O_3$ | do | 4.0 |
| $CaO$ | do | 2.5 |
| Total volatile content (at 1800° F.) | do | 5–9 |
| Moisture | do | 0.2 |
| Mohs hardness number | | 4 |
| Average particle size microns | | 1.7 to 2.0 |

Zinc ethylene bis-dithiocarbamate may be precipitated as a fine crystalline product by addition with agitation of an aqueous solution of a water-soluble zinc salt such as zinc chloride to an aqueous solution of a water-soluble salt of ethylene bis-dithiocarbamate. The water-soluble salt of ethylene bis-dithiocarbamate, so used, is readily prepared by the reaction of ethylene diamine and carbon disulfide in an aqueous solution of a strong base such as sodium, potassium, calcium, barium, lithium, or magnesium hydroxide.

Preferably the zinc ethylene bis-dithiocarbamate is precipitated by the addition of an aqueous solution of zinc chloride to an aqueous solution containing about 10 to 30% sodium ethylene bis-dithiocarbamate while maintaining the pH of the reacting mass at about 8 to 12. The precipitate, so obtained, is easily separated by filtration and will ordinarily contain as impurities from 1 to 2% zinc hydroxide and 7 to 9% sodium chloride, the exact amounts varying with the reaction conditions. This commercial product is generally of satisfactory purity for fungicidal use but, if desired, a more refined product may be obtained by crystallization or other conventional methods of purification.

While the flame-resistant, water-dispersible, fungicidal powders of the invention are readily obtained by a simple dry mixing of finely divided zinc ethylene bis-dithiocarbamate with finely divided fuller's earth in amount corresponding to at least 20% by weight of the zinc ethylene bis-dithiocarbamate and preferably from about 20% to about 60% by weight of the zinc compound, it is preferred, for reasons of safety in the manufacturing operation, to add the fuller's earth prior to the separation of the zinc salt from the aqueous mass in which it is precipitated. Thus the fuller's earth may be added to the aqueous solution of sodium ethylene bis-dithiocarbamate before addition of zinc chloride or, alternatively, it may be added during the precipitation step or after completion of the precipitation but before filtration. The filtered solid may then be dried and ground without fear of ignition.

According to a preferred embodiment of the invention, fuller's earth is admixed by any of the aforementioned methods to provide flame-resistant, free-flowing, water-dispersible powders containing 65 to 75% by weight of zinc ethylene bis-dithiocarbamate, 13 to 35% by weight of fuller's earth, the minimum amount of fuller's earth corresponding to at least 20% by weight of the weight of zinc ethylene bis-dithiocarbamate, and the remainder of the dust consisting substantially of sodium chloride and zinc hydroxide.

Examples follow illustrating specific compositions of the invention and their properties.

*Example I*

Finely ground zinc ethylene bis-dithiocarbamate having an average particle size less than 5 microns is mixed with fuller's earth having an average particle size less than about 2 microns in a ribbon blender in the proportions of 20 parts by weight of the fuller's earth for each 100 parts by weight of the zinc ethylene bis-dithiocarbamate to give a uniform mixture.

The mixture of this example is a free-flowing powder. It is suitable without further treatment for application as a dust using the conventional dusting apparatus. Aqueous suspensions suitable for application by spraying are easily prepared by stirring the composition of this example into water; the composition disperses readily in the water.

If a flame, say such as is obtained with a Bunsen burner, is brought to bear directly on the surface of the composition of this example, the spot to which the flame is applied gradually chars and an occasional slight wisp of blue flame is emitted but as soon as the Bunsen flame is removed, the charring ceases and there is no further combustion of the composition.

In contrast, a mixture prepared by the procedure of Example I but employing only 15 parts by weight of fuller's earth for each 100 parts by weight of zinc ethylene bis-dithiocarbamate chars readily and burns even after removal of the Bunsen flame.

*Example II*

340 parts by weight of a 20% aqueous solution of zinc chloride is added gradually over a thirty-minute period to a vessel containing 400 parts by weight of an aqueous 25% solution of sodium ethylene bis-dithiocarbamate. The mass in the vessel is agitated thruout the reaction period and is maintained at about pH 10.

At the completion of the zinc chloride addition, 30.6 parts by weight of finely divided fuller's earth are stirred into the mass in the vessel. The suspended solids are then removed by filtration and the filter cake is dried and ground. The ground product has the following analysis:

| | |
|---|---|
| 70% | zinc ethylene bis-dithiocarbamate (technical) |
| 8% | sodium chloride |
| 1% | zinc hydroxide |
| 21% | fuller's earth |

The composition of this example will not support combustion. It is free-flowing; it is water-dispersible without need for including a conventional dispersing agent and is useful for application to growing crops for the control of certain varieties of fungus diseases.

The fireproofed zinc ethylene bis-dithiocarbamate-fuller's earth compositions of the invention, described above, can be used in admixture with other inert substances and in combination with other known fungicide, bactericide, or insecticide agents.

I claim:

1. A flame-resistant, water-dispersible, fungicidal powder comprising zinc ethylene bis-dithiocarbamate in admixture with an amount of fuller's earth corresponding to at least about 20% by weight of the zinc ethylene bis-dithiocarbamate.

2. A flame-resistant, water-dispersible, fungicidal powder comprising zinc ethylene bis-dithiocarbamate in admixture with an amount of fuller's earth corresponding to about 20% to about 60% by weight of the zinc ethylene bis-dithiocarbamate.

3. A flame-resistant, water-dispersible, fungicidal powder comprising in admixture 65 to 75% by weight of zinc ethylene bis-dithiocarbamate, 13 to 35% by weight of fuller's earth, the minimum amount of fuller's earth corresponding to at least 20% by weight of the weight of zinc ethylene bis-dithiocarbamate and the remainder of the powder consisting substantially of sodium chloride and zinc hydroxide.

ALBERT L. FLENNER.

REFERENCES CITED

The following references are of record in the file of this patent:

UNITED STATES PATENTS

| Number | Name | Date |
|---|---|---|
| 2,217,358 | Coltof | Oct. 8, 1940 |
| 2,415,282 | Hartshorne | Feb. 4, 1947 |
| 2,457,674 | Heuberger | Dec. 28, 1948 |

FOREIGN PATENTS

| Number | Country | Date |
|---|---|---|
| 8,103 | Australia | Apr. 24, 1933 |
| 554,729 | Great Britain | July 16, 1943 |

OTHER REFERENCES

Vivian, "A Second List of Organic Sulfur Compounds Used as Insecticides," U. S. Dept. of Agriculture publication E-539, April 1941, pages 2 and 3. (Copy in Division 43.)